US006790923B2

(12) United States Patent
Smith et al.

(10) Patent No.: US 6,790,923 B2
(45) Date of Patent: Sep. 14, 2004

(54) MELT-PROCESSIBLE, WEAR RESISTANT POLYETHYLENE

(75) Inventors: Paul Smith, Zurich (CH); Jeroen Visjager, Zurich (CH); Theo Tervoort, Zurich (CH)

(73) Assignee: Eidgenossische Technische Hochschule Zurich, Zurich (CH)

( * ) Notice: Subject to any disclaimer, the term of this patent is extended or adjusted under 35 U.S.C. 154(b) by 148 days.

(21) Appl. No.: 10/002,616

(22) Filed: Dec. 5, 2001

(65) Prior Publication Data

US 2002/0132950 A1 Sep. 19, 2002

Related U.S. Application Data

(60) Provisional application No. 60/251,395, filed on Dec. 6, 2000.

(51) Int. Cl.$^7$ .................. C08F 210/02; C08F 110/02
(52) U.S. Cl. .................. 526/352; 526/160; 526/165; 526/348; 526/348.2
(58) Field of Search ................... 526/352, 348, 526/348.2

(56) References Cited

U.S. PATENT DOCUMENTS

| | | | |
|---|---|---|---|
| 3,956,253 A | | 5/1976 | Braun |
| 5,422,061 A | | 6/1995 | Takahashi et al. |
| 5,637,660 A | | 6/1997 | Nagy et al. |
| 5,658,992 A | | 8/1997 | Ehlers et al. |
| 5,834,393 A | * | 11/1998 | Jacobsen et al. |
| 5,852,143 A | | 12/1998 | Sishta et al. |
| 6,114,457 A | | 9/2000 | Markel et al. |
| 6,214,469 B1 | | 4/2001 | Sukhadia et al. |
| 6,228,900 B1 | | 5/2001 | Shen et al. |
| 6,242,507 B1 | | 6/2001 | Saum et al. |
| 6,506,866 B2 | * | 1/2003 | Jacobsen et al. |

OTHER PUBLICATIONS

*U.S. Aldrich Handbook of Fine Chemicals and Laboratory Equipment*, 2000–2001 Edition, pp. 1360–1361.
J.C. Anderson, "High Density and Ultr–High Molecular Weight Polyethylenes: their Wear Properties and Bearing Applications," Tribology International, 1982, vol. 15(1) pp. 43–47.
O.K. Muratoglu et al., "Unified Model for High Corsslinked Ultra–High Molecular Weight Polyethylenes (UHMWPE)," Biomaterilas, 1999, Vo. 20, pp. 1463–1470.
K. Jordens et al., "The influence of Molecular Weight and Thermal History on the Thermal, heological, and Mechanical Properties of Metallocene–Catalyzed Linear Polyethylenes," Polymer, 2000, Vo. 41, pp. 7175–7192.
H. Hohen et al., "Verschleißverhalten von Ultrahochmolekularem Polyethylen bei Geitbeanspruchung," Kunststoffe, 1992, vol. 82, pp. 391–394.
J. Berzen, "Hostalen GUR–Prüfmethoden und Charakteristik eines Verschleißfesten Werkstoffes," CA–Chemie–Technik, 1974, Nr. 4, pp. 129–134.

P. Vadhar and T. Kyu, "Effects of Mixing on Morphology, Rehology, and Mechanical Properties of Blends of Ultra–High Molecular Weight Polyethylene with Lenear Low–Density Polyethylene," Polymer Engineering and Science, 1987, Vo. 27(3), pp. 202–210.
M. M. Dumoulin et al., "Rheologici and Mechanical Behavior of the UHMWPE/MDPE Mixtures,," 1984, vol. 24(2), pp. 117–126.
L. Minkova and M. Mihailov, "A Calorimetric Study of Normal High Density and Ultra–High Molecular Weight Polyethylene Blends," Colloid & Polymer Science, 1987, vol. 265, pp. 1–7.
D. M. Khanin et al., "Relation of Abrasion ot Some Molecular–Weight Characteristics of High–Pressure Polyethylene," Journal of Applied Chemistry of the USSR, 1989, vol. 62, pp. 2451–2453.
Y. Huang and N. Brown, "Slow Crack Growth in Blends of HDPE and UHMWPE," Polymer, 1992, Vo. 27, pp 44–48.
A. G. Sirota et al., "On Abrasive Wear Resistance Dependence on the Molecular Characteristics of HDPE," Trenie I. Iznos, 1986, vol. 7, pp. 358–361.
A.F. Margolies, "Effect of Molecular Weight on Properties of HDPE," SPE Journal, 1971, Vo. 27, pp. 44–48.
R.I. Trezona et al., "Tranisitions between Two–body and Three–body Abrasive Wear: Influence of Test Conditions in the Microscale Abrasive Wear Test," Wear, 1999, vol. 229, pp. 205–214.
J.F. Vega et al., "Small–Amlitude Oscillatory Shear Flow Measurements as a Tool to Detect Very Low Amounts of Long Chain Branching in Polyethylenes," Macromolecutes, 1998, vol. 31, pp. 3639–3647.
A. Boscolo Boscoletto et al., "An Investigation on Rheological and Impact Behavior of High Density and Ultrahigh Molecular Weight Polyethylene Mixtures," European Polymer Journal, 1997, vol. 34, pp. 791–792.
M.S. Silverstein and J. Breitner, Wear and Friction in UHMWPE/PTFE Blends, Polymer Preprints, 1993, vol. 34, pp. 791–792.

T. Tinçer and M. Coşkun, "Melt Blending of Ultrahigh–Milecular Weight and High–Density Polyethylene: the effect of the Mixing Rate on Thermal, Mechanical, and Morphological Properties," Polymer Engineering and Science, 1993, vol. 33, pp. 1243–1250.
K.L. Rutherford and I.M. Hutchings, "Theory and Application of a Micro–Scale Abrasive Wear Test," Journal of Testing and Evaluation, 1997, Vo.. 25, pp. 250–260.
R.I. Trezona and I.M. Hutchings, Three–body Abrasive Wear Testing of Soft Materials, Wear, 1999, vol. 31, pp. 3639.

* cited by examiner

*Primary Examiner*—Caixia Lu
(74) *Attorney, Agent, or Firm*—Mayer Brown Rowe & Maw LLP

(57) ABSTRACT

Melt-processible, thermoplastic polyethylene compositions of high resistance against wear are disclosed and methods for making and processing same. Additionally, products comprising these compositions are described.

17 Claims, No Drawings

MELT-PROCESSIBLE, WEAR RESISTANT POLYETHYLENE

CROSS-REFERENCE TO RELATED APPLICATION

This application claims the benefit of U.S. provisional application No. 60/251,395 filed Dec. 6, 2000, the entire disclosure of which is hereby incorporated by reference.

FIELD OF THE INVENTION

This invention relates to melt-processible, wear resistant polyethylene, compositions thereof, articles formed therefrom, and methods for making the same.

BACKGROUND OF THE INVENTION

Ultrahigh molecular weight polyethylene ("UHMW PE") is well-known for, among other properties, its chemical resistance, low friction coefficient, high toughness and in particular its excellent resistance against wear. As a result, it has found numerous applications in environments where abrasion and friction may occur, such as in the chemical industry, mining, mechanical engineering, the field of biomedical implants and the textile industry. Equally well-known, however, is the intractability of this polymer, which is due to the fact that UHMW PE, above its crystalline melting temperature, does not form a fluid phase that is of a viscosity that permits melt-processing techniques used with many thermoplastic polymers. Commonly, the viscosity of UHMW PE is above $10^6$ Pa.s at 180° C. Due to this high viscosity, UHMW PE is processed into shapes and objects with techniques that are dissimilar to melt-processing methods. Rods, sheets, blocks, slabs and profiles of UHMW PE are produced by cumbersome methods such as, for example, ram-extrusion, pre-forming and sintering of compressed powder, optionally followed by machining or skiving, high isostatic pressure processing, and the like. Unfortunately, these methods generally are less economical than common melt-processing, and, in addition, severely limit the types and characteristics of objects and products that can be manufactured with this polymer.

The above drawback of UHMW PE has long been recognized and techniques have been developed to circumvent the intractability of this material by, for example, adding solvents, lubricants, plasticizers, processing aids, as well as certain polyethylenes of lower molecular weight. See, e.g., U.S. Pat. Nos. 5,658,992 and 5,422,061. The aforementioned additions of lubricants, plasticizers, and processing aids or lower molecular weight polyethylenes, however, do not yield melt-processible PE compositions with a desired combination of properties.

SUMMARY OF THE INVENTION

Objectives of the invention include providing melt-processible polyethylenes that possess one or more of the beneficial properties associated with UHMW PE.

Accordingly, one of the objectives of the present invention is to provide melt-processible polyethylenes having good wear resistance.

Additionally, it is an object of the present invention to provide a method to melt-process polyethylene compositions into useful shapes and articles of high resistance against wear.

Still another object of the present invention is to provide useful shapes and articles of high resistance against wear that are manufactured by melt-processing of polyethylene compositions.

Yet another object of this invention is to provide novel useful shapes and articles of high resistance against wear that comprise polyethylene.

The present invention provides a melt-processible ethylene having high resistance against wear, and compositions and articles comprising at least in part a continuous polymeric phase comprising a melt-processible polyethylene having high resistance against wear.

The present invention also provides a method for producing an article comprising melt-processing a composition comprising a melt-processible polyethylene, wherein said polyethylene has a high resistance against wear.

Additional objects, advantages and features of the present invention are set forth in this specification, and in part will become apparent to those skilled in the art on examination of the following, or may be learned by practice of the invention. The inventions disclosed in this application are not limited to any particular set of or combination of objects, advantages and features. It is contemplated that various combinations of the stated objects, advantages and features make up the inventions disclosed in this application.

DETAILED DESCRIPTION OF THE INVENTION

Definition: "Monomeric units" refers herein to a portion of a polymer that corresponds to the monomer reactant used to form the polymer. For example, —$CH_2CH_2$— represents a monomeric unit derived from the monomer reactant ethylene.

The polyethylene ("PE")

The polyethylenes according to the present invention generally are polymers of ethylene. Within the scope of the present invention it is contemplated, however, that the PE may also comprise certain amounts of one or more of the commonly employed co-monomers such as alpha-olefins containing 3–20 carbon atoms such as propylene, 1-butene, 1-pentene, 4-methyl-1-pentene, 1-hexene, 1-octene, 4,6-dimethyl-1-heptene, 1-decene, 1-tetradecene, 1-hexadecene, 1-octadecene, 1-eicosene, allylcyclohexane, and the like, at least partially fluorinated alpha-olefins such as tetrafluoroethylene, chlorotrifluoroethylene, and the like, alkenecarboxylic acids, carbon monoxide, vinyl acetate, vinyl alcohol, alkyl acrylates such as methyl acrylate, ethyl acrylate, butyl acrylate, and the like, or mixtures thereof. Preferably, the amount of such co-monomer is less than about 10 mole percent (herein "mol %"), for instance less than about 5 mol % or less than about 3 mol %. Accordingly, the amount of co-monomer on a weight basis may be less than about 10 wt %, for instance less than about 5 wt %, such as in the range of about 0.5–5 wt % or about 1–4 wt %.

In one embodiment of the present invention the polyethylenes have high resistance against wear, combined with a beneficial thermoplastic flow behavior. An indication of the thermoplastic flow behavior of the polymer can be readily obtained with the commonly employed method of the determination of a melt-viscosity. The latter method, for the present PE's is carried out by measuring the value of the complex viscosity at a frequency of $10^{-1}$ rad/s and at a temperature of 180° C. (Under these experimental conditions, ultra-high molecular weight polyethylenes have a viscosity of more than about $10^6$ Pa.s. Preferably, the polyethylenes according to the present invention have melt viscosity of less than $10^6$ Pa.s, for instance less than about $5 \cdot 10^5$ Pa.s, less than about $10^5$ Pa.s, less than about $10^4$ Pa.s, or less than about $5 \cdot 10^3$ Pa.s. The minimum value of the viscosity of the polyethylenes used in the present invention depends on the particular end product and processing technique. For most applications, it is preferred that the viscosity is more than about $10^2$ Pa.s, for instance more than about $5 \cdot 10^2$ Pa.s or more than about $10^3$ Pa.s.

Preferably, the polyethylenes according to the present invention have a value of $M_w$ (weight average molecular weight) of less than about 1,000,000 g/mol, for instance less than about 700,000 g/mol, less than about 500,000 g/mol, or less than about 400,000 g/mol. In one embodiment, the weight average molecular weight is greater than about 100,000 g/mol. In another embodiment, for instance in an embodiment where a comparatively high toughness is desired, it may be preferred that the weight average molecular weight of the polyethylene is greater than about 150,000 g/mol, for instance greater than about 200,000 g/mol or greater than about 250,000 g/mol.

Preferred polyethylenes according to the present invention having high resistance against wear combined with a highly beneficial thermoplastic flow behavior are characterized by a value of the number average molecular weight ($M_n$) in a particular range. The latter can be also conveniently determined by the technique of gel permeation chromatography. Preferred polyethylenes according to the present invention include those having a value of number average molecular weight $M_n$ of more than about 25,000 g/mol, for instance more than about 50,000, more than about 75,000, or more than about 100,000 g/mol. The polyethylenes according to the present invention have a value of $M_n$ of less than about 1,000,000 g/mol, such as less than about 700,000 g/mol, less than about 500,000 g/mol, or less than about 400,000 g/mol.

The polyethylenes of the present invention preferably have a polydispersity $D=M_w/M_n$ that is less than about 10, for instance less than about 8, less than about 5, less than about 4, or less than about 3. The polydispersity is 1 or more, and preferably, for instance for ease of manufacturing the polyethylene, at least about 1.3, such as at least about 1.5, at least about 1.75, or at least about 2.

The present polyethylenes have a high wear resistance. Preferably, the present polyethylenes have a wear coefficient ($\kappa$) that is at most about $3.2 \cdot 10^{-4}$ mm$^3$/mN, for instance at most about $2.9 \cdot 10^{-4}$ mm$^3$/mN, at most about $2.7 \cdot 10^{-4}$ mm$^3$/mN, at most about $2.4 \cdot 10^{-4}$ mm$^3$/mN, at most about $2.2 \cdot 10^{-4}$ mm$^3$/mN, or at most about $2.0 \cdot 10^{-4}$ mm$^3$/mN.

Preferred polyethylenes include those having a low degree of crystallinity. The latter value is conveniently determined by the standard method of differential scanning calorimetry. Preferably, the polyethylenes according to the present invention are characterized by a degree of crystallinity of once-molten and recrystallized unoriented material of less than about 65%, for instance less than about 60%, or less than about 55%. Preferably, the polyethylenes according to the present invention are characterized by a degree of crystallinity of once-molten and recrystallized unoriented material of more than about 5%, for instance more than about 10% or more than about 15%.

Preferred polyethylenes according to the present invention include those having a melting temperature of at least about 100° C., for instance at least about 105° C., at least about 115° C., or at least about 125° C.

Accordingly, polyethylenes according to one embodiment of the present invention include those having:

A weight average molecular weight in the range of about 150,000–500,000 g/mol;
A polydispersity in the range of about 2–4;
A co-monomer content of about 0.5–5 wt %; and
A melting temperature of at least about 100° C.

The polyethylenes of the present invention can be synthesized according to the chemical methods for the polymerization of ethylene as described in detail in the literature (for example, Whiteley, K. S., in Industrial Polymers Handbook, Wilkes, E. S. ed., Wiley-VCH, Volume 2, pp. 643–691, 2001) and as practiced in the art. The present polyethylenes may be prepared with the use of metallocene (single-site) catalysts. Examples of such catalyst are disclosed in, for instance, U.S. Pat. No. 5,637,660. When combined with an activator such as methyl aluminoxane (MAO), or an ionic borate, the catalysts efficiently polymerize olefins such as ethylene or mixtures of ethylene and alpha-olefins to yield polymers with narrow molecular weight distributions. Furthermore, the polyethylenes according to the present invention can be manufactured by preparative gel permeation chromatography or other methods that permit fractionation according to molecular weight (see, for example Tung, L. H,. Fractionation, in Encyclopedia of Polymer Science and Technology, Mark, H. F. et al. Eds., Volume 7, Wiley, New York, pp. 298–327, 1987). Also, the present polyethylenes may be prepared by hydrogenating polybutadiene that is prepared through anionic polymerization.

The present invention also contemplates compositions and articles comprising a continuous phase having at least about 15 wt %, preferably at least about 45 wt %, and more preferably at least about 95 wt % of the melt-processable ethylene polymer including polymers that are formed by blending two or more ethylene polymers of the present invention. An exemplary composition could include a composition or an article wherein the continuous phase composed of at least about 99 wt % of a PE according to the present invention filled with a filler such as talc, glass and/or other inorganic or organic particles. In one embodiment, the filler is present, relative to the total weight of the composition, in an amount of at least 1 about wt %, for instance at least about 5 wt % or at least about 10 wt %. The composition generally comprises less than about 90 wt % of filler, for instance less than about 50 wt %, less than about 30 wt %, or less than about 20 wt %.

The compositions according to the present invention optionally may include additives, nucleating- and clarifying agents, colorants, fillers (e.g., reinforcement and/or for cost-reduction), property-enhancement purposes and the like, reinforcing matter, such as glass-, aramid-, carbon fibers and the like, plasticizers, lubricants, processing aids, blowing or foaming agents, electrically conducting matter, other polymers, including other polyethylenes, and copolymers, and rubbers and thermoplastic rubber blends, and the like. Depending on the particular application, one or more of the above optional additional ingredients and their respective amounts are selected according to standard practices known to those skilled in the art of standard polymer processing, compounding and applications.

Processing

The PE compositions according to the present invention can be processed into useful materials, neat or compounded, single- and multi-component shapes and articles using common melt-processing methods used for thermoplastic polymers that are well known in the art. Typical examples of such methods are granulation, pelletizing, (melt-) compounding, melt-blending, injection molding, transfer-molding, melt-blowing, melt-compression molding, melt-extrusion, melt-casting, melt-spinning, blow-molding, melt-coating, melt-adhesion, welding, melt-rotation molding, dip-blow-molding, melt-impregnation, extrusion blow-molding, melt-roll coating, embossing, vacuum forming, melt-coextrusion, foaming, calendering, rolling, and the like.

Melt-processing of the PE compositions according to the present invention, in its most general form, often comprises heating the composition to above the crystalline melting temperature of the PE's, which, of once-molten material, typically are in the range from about 100° C. to about 145° C., although somewhat lower, and higher temperatures may occur, to yield a polymer fluid phase. The latter melt is shaped through common means into the desired form, and, subsequently or simultaneously, cooled to a temperature below the crystalline melting temperature of the PE's, yielding an object or article of good and useful mechanical properties and a high resistance against wear. In processing operations involving transfer through one or more dies of melts of the PE such as in fiber spinning, film- and tape extrusion, and the like, in one embodiment of the present invention it is beneficial to employ conical dies of low entrance angle (less than 90°) as this may reduce melt-instabilities and melt fracture, and, therewith, increases the processing speed.

In another embodiment of the present invention the PE is crosslinked through, for example, irradiation and/or chemical means. When crosslinked to yield branched materials, the latter may exhibit improved film-blowing characteristics, and if crosslinked to form macroscopic networks, these materials may be a rubber, or can be subsequently stretched in the melt to yield heat-shrinkable films, or may display increased resistance to creep and even further improved resistance against wear. See, e.g. U.S. Pat. Nos. 6,242,507, 6,228,900, 3,956,253.

Certain articles, such as, but not limited to, fibers and films made according to the present invention optionally may, subsequently, be drawn or otherwise deformed in one or more directions, embossed, and the like to further improve the physico-chemical, mechanical, barrier, optical and/or surface properties, or be otherwise post-treated (for instance, quenched, heat treated, pressure treated, and/or chemically treated). The above methods and numerous modifications thereof and other forming and shaping, and post-processing techniques are well know and commonly practiced. Those skilled in the art of processing of thermoplastic polymers are capable of selecting the appropriate melt-processing and optional post-processing technology that is most economical and appropriate for the desired end product, or product intermediate.

Products and Applications

The products contemplated according to the present invention are numerous, and cover many fields of applications. This is especially true as polyethylene has been approved also for food contact and for biomedical applications. Without limiting the scope and use of the present invention, some illustrative products are indicated herein. Generally speaking, the products and materials according to the present invention include most or all applications that currently are covered by standard ultra-high molecular weight PE (cf. Harvey L. Stein: "Ultra High Molecular Weight Polyethylene (UHMWPE)", Engineered Materials Handbook, Volume 2: Engineering Plastics, ASMInternational, Materials Park, Ohio 44073, USA (1999), pp. 167–171, which pages are hereby incorporated in their entirety by reference). Thus, applications are envisioned, among other industries, in the wire and cable industry, the printed-circuit board industry, semi-conductor industry, the chemical processing industry, the automotive industry, out-door products and coatings industry, the food industry, the biomedical industry.

In particular, the PE may be used to form at least parts in articles such as, for example, in a wire (and/or wire coating), an optical fiber (and/or coating), a cable, a printed-circuit board, a semiconductor, an automotive part, an outdoor product, a food-industry product, a biomedical intermediate or product such as artificial implants, orthopedic implants, a composite material, a melt-spun mono- or multi-filament fiber, an oriented or un-oriented fiber, a hollow, porous or dense component; a woven or non-woven fabric, a filter, a membrane, a film, a multi-layer- and/or multicomponent film, a barrier film, a battery separator film for primary or secondary batteries (e.g. lithium ion batteries), a container, a bag, a bottle, a rod, a liner, a vessel, a pipe, a pump, a valve, an O-ring, an expansion joint, a gasket, a heat exchanger, an injection-molded article, a sealable packaging, a profile, heat-shrinkable film, a thermoplastically welded part, a blow molded part, a roto molded part, a ram extruded part, a screw extruded profile, and/or fine particles formed by precipitation of a solution of the PE.

Typical examples of intermediate and end-user wear resistant products that can be made according to the present invention include, but are not limited to granulate, thermoplastic composites, melt-spun mono- and multi-filament fibers, oriented and not, hollow, porous and dense, single- and multi-component; fabrics, non-wovens, cloths, felts, filters, gas house filtration bags; sheets, membranes, films (thin and thick, dense and porous), fine particle additives for coatings; doctor blades, containers, bags, bottles, generally simple and complex parts, rods, tubes, profiles, ski soles, snow board soles, snow mobile runners, hose linings , linings and internal components for vessels, tanks, columns, pipes, fittings, pumps, pump housings, valves, valve seats, tubes and fittings for beverage dispensing systems; O-rings, seals, gaskets, gears, ball bearings, screws, nails, nuts, bolts, heat exchangers, hoses, expansion joints, shrinkable tubes; coatings, such as protective coatings, electrostatic coatings, cable and wire coatings, optical fiber coatings, and the like. It is also envisaged that articles are made that are particularly useful as sliding members, such as tape guides, parts of artificial implants and the like. The above products and articles may be comprised in part or in total of PE compositions according to the present invention, or optionally include dissimilar materials, such as for example in multi-layer and multi-component films, coatings, injection molded articles, containers, pipes, profiles, sliding parts in printing devices, sliding parts in major appliances (dish washers, cloth washers, dryers, etc.), sliding parts in automotive devices (steering systems, steel cable guides), sliding parts in conveyor systems (flights), sliding parts in elevators and escalators, and the like.

EXAMPLES

The following examples are given as particular embodiments of the invention and to demonstrate the practice and advantages thereof. It is understood that the examples are given by way of illustration and are not intended to limit the specification or the claims that follow in any manner.

General Methods and Materials

Viscosity.

The absolute values of the complex viscosities of different Polyethylenes were measured from small amplitude oscillatory shear experiments (Rheometrics Dynamic Spectrometer RDS-II) at 180° C., and are given here for those viscosity values determined at a frequency of $10^{-1}$ rad/s using standard plate-plate geometry.

Molecular Weight Distribution.

The molecular weight distributions of the various materials used were determined by high temperature gel permeation chromatography with a Waters 150C ALC/GPC instrument with the following specifications: column type: TSK GMHXL-HT (13 $\mu$m), mobile phase flow rate: 0.5 ml min$^{-1}$, solvent and mobile phase antioxidant: 1,2,4-trichlorobenzene and 2,6-di-t-butyl-p-cresol, detector: refractive index and column temperature: 135° C. Standard polystyrene samples (Easy Cal Kit, Polymer Laboratories, UK) were used for calibration; the total elution time was about 120 min.

Crystallinities and Melting Temperatures.

The degree of crystallinity of the various PE samples were determined with a Netzsch differential scanning calorimeter (DSC, model 200) calibrated with Indium. Samples of approximately 5 mg were heated at a rate of 10° C./min under nitrogen atmosphere. The crystallinity was calculated from the enthalpy of fusion, determined from the endothermal peak of once molten (at 180° C.) and cooled (at 10° C./min) material, adopting the value of 293 J/g for 100% crystalline PE (Wunderlich, B. Macromolecular Physics, Academic Press, New York, Vol. 1, p. 388, 1973). Melting temperatures refer to the peak temperature of the above referred endothermal peak.

Wear Coefficients.

Abrasive wear measurements were carried out using a custom-built device according to specifications and method analogous to those described by Hutchings [Trezona, R. I., Allsopp, D. N., Hutchings, I. M., Wear, 229, 205 (1999)]. In the device, a hard sphere (1" Tungsten Carbide ball with a 400 nm surface roughness, Atlas Ball & Bearing Co. Ltd., UK) clamped between two coaxial driving shafts, rotated at a constant speed of 150 rpm. The sample was placed against the ball with a normal force of 0.27 N, while an abrasive slurry (0.75 g SiC (mean particle size of 4–5 microns) per cm$^3$ distilled water) was dripping onto the ball at a feed rate of 5 cm$^3$/min. The size of the resulting abrasive wear crater was measured with an optical microscope. In all cases, spherical craters were observed; the corresponding wear volume V was calculated according to:

$$V = \left(\frac{\pi d^4}{64R}\right)$$

where R is the ball radius and d is the surface chordal diameter of the crater [Rutherford, K. L., Hutchings, I. M., J Test. Eval., 25, 250 (1997)]. To correct the measured diameter of the wear craters (d$^1$), which typically consist of a central spherical crater surrounded by a roughened or 'scuffed' annular region, the following empirical rule (according to Trezona et al. [Trezona, R. I., Hutchings, I. M., Wear, 235, 209 (1999)] was applied:

$$d = \left(\frac{d' - 0.1407}{0.9358}\right) \text{ for } 0.5 \text{ mm} \leq d \leq 2.193 \text{ mm}$$

$d = d'$ for $d > 2.193$ mm

For abrasive wear of homogeneous materials the wear volume is expected to be proportional to the product of the sliding distance S and the normal force N:

$V = \kappa SN$ which defines the wear coefficient κ. The linearity of this equation with respect to the applied force was verified for polyethylenes I and III and linear behaviour was observed, in both cases, up to a normal force of ~0.3 N. Therefore, in all experiments a normal force of 0.27 N was selected. In all tests the total number of ball rotations was chosen to be 9,000, which corresponds to a sliding distance of 718 m.

Materials.

Various polyethylenes ("PE") were obtained from DSM (Stamylan; PE's I–V), National Institute of Standards and Technology (N.I.S.T., US), Societ/e National Elf Aquitaine Production (S.N.P.A., France) and Aldrich (LLDPE, No. 42,807-8 in the 2000–2001 catalogue).

Blends.

Various blends were prepared of certain polyethylenes with a small scale laboratory recycling twin-screw extruder (MicroCompounder, DACA Instruments, Santa Barbara, Calif.), the temperature of which was kept at 180° C. The material residence time was 10 at 120 rpm, after which the product was discharged.

Samples.

Samples of 0.3 mm thickness and 25 mm diameter for the wear tests were compression molded unless indicated otherwise at 180° C. in a Carver press (model M 25T) for 10 min at 1 metric ton, 10 min at 10 ton and then cooled to room temperature during 4 min under 4 ton in a water-cooled Carver press.

Comparative Examples A–C

The following Table I presents an overview of the viscosities, number- and weight average molecular weights ($M_n$, $M_w$), polydispersities ($M_w/M_n$) and crystallinities and wear coefficients of different ultrahigh molecular weight polyethylenes.

TABLE I

| Sample | Viscosity at 10$^{-1}$ rad/s (Pa.s) | $\overline{M}_n$ (kg/mol) | $\overline{M}_w$ (kg/mol) | $\overline{M}_w/\overline{M}_n$ | Crystallinity (%) | Wear coefficient, 10$^4$.κ (mm$^3$/mN) |
|---|---|---|---|---|---|---|
| PE-III | 4.5 · 10$^6$ | 285 | 2,063 | 7.2 | 53.6 | 2.57 |
| PE-IV | 7.3 · 10$^6$ | nd | 4 · 10$^3$* | nd | 45.4 | 2.6 |
| PE-V | 1.02 · 10$^7$ | nd | 6 · 10$^3$* | nd | 46.1 | 2.5 | nd: not determined
*estimated from viscosity

The data in this table illustrate that ultrahigh molecular weight polyethylenes may have wear coefficients of less then 3.2.10$^{-4}$ mm$^3$/mN but, in agreement with the state of the art, all exhibit a viscosity in excess of 10$^6$·Pa.s and hence are not melt-processable according to the standards employed in this disclosure.

Comparative Examples D–J

The following Table II presents an overview of the viscosities, number- and weight average molecular weights ($M_n$, $M_w$), polydispersities ($M_w/M_n$) and crystallinities and wear coefficients of another set of different polyethylenes that are not of ultrahigh molecular weight.

TABLE II

| Sample | Viscosity at $10^{-1}$ rad/s (Pa.s) | $\overline{M}_n$ (kg/mol) | $\overline{M}_w$ (kg/mol) | $\overline{M}_w/\overline{M}_n$ | Crystallinity (%) | Wear coefficient, $10^4 \cdot \kappa$ (mm$^3$/mN) |
|---|---|---|---|---|---|---|
| PE-I | $2.9 \cdot 10^3$ | 21 | 91 | 4.3 | 63.2 | 4.02 |
| PE-II | $7.0 \cdot 10^4$ | 7 | 230 | 32.9 | 66.9 | 4.20 |
| 90/10 PE-II/PE-III | $1.6 \cdot 10^5$ | 8 | 414 | 50.0 | 66.6 | 3.90 |
| 80/20 PE-II/PE-III | $3.5 \cdot 10^5$ | 9 | 522 | 58.0 | 65.6 | 3.72 |
| 60/40 PE-II/PE-III | $8.0 \cdot 10^5$ | 12 | 978 | 81.5 | 61.8 | 3.31 |
| 90/10 PE-I/PE-III | $3.4 \cdot 10^4$ | 24 | 289 | 12.0 | 62.0 | 3.59 |
| 80/20 PE-I/PE-III | $2.0 \cdot 10^5$ | 26 | 529 | 20.3 | 57.2 | 3.60 |

The data in this table illustrate that polyethylenes that are not of ultrahigh molecular weight may have viscosities of less than $10^6$ Pa.s, but all exhibit a wear coefficient in excess of $3.2 \cdot 10^{-4}$ mm$^3$/mN and hence, and in agreement with the state of the art, are not highly resistant against wear according to the standards employed in this disclosure.

Examples 1–5

The following Table III presents an overview of the viscosities, number- and weight average molecular weights ($M_n$, $M_w$), polydispersities ($M_w/M_n$) and crystallinities and wear coefficients of another set of different polyethylenes that are not of ultrahigh molecular weight.

TABLE III

| Sample | Viscosity at $10^{-1}$ rad/s (Pa.s) | $\overline{M}_n$ (kg/mol) | $\overline{M}_w$ (kg/mol) | $\overline{M}_w/\overline{M}_n$ | Crystallinity (%) | Wear coefficient, $10^4 \cdot \kappa$ (mm$^3$/mN) |
|---|---|---|---|---|---|---|
| PE 1484a, N.I.S.T. | $4.0 \cdot 10^3$ | 102 | 120 | 1.2 | 60.9 | 2.80 |
| Fraction, S.N.P.A. | $1.1 \cdot 10^5$ | 267 | 329 | 1.2 | 49.7 | 2.57 |
| Fraction, S.N.P.A. | $3.1 \cdot 10^5$ | 360 | 448 | 1.2 | 49.5 | 2.56 |
| Fraction, S.N.P.A. | $4.2 \cdot 10^5$ | 450 | 490 | 1.1 | 54.3 | 2.44 |
| LLDPE, Aldrich | $4.6 \cdot 10^3$ | nd | 125 | nd | 44.4 | 2.47 | nd: not determined

The data in this table lists polyethylenes that are not of ultrahigh molecular weight, have viscosities of less than $10^6$ Pa.s, and exhibit a wear coefficient of less than $3.2 \cdot 10^{-4}$ mm$^3$/mN.

Example 6

A polyethylene is prepared having the following properties:

$M_w$ about 350,000 g/mol;
Polydispersity about 2.5; and
1-Hexene co-monomer content of about 4 wt %.

The wear coefficient is determined to be about $1.9 \cdot 10^{-4}$ mm$^3$/mN.

Having described specific embodiments of the present invention, it will be understood that many modifications thereof will readily appear or may be suggested to those skilled in the art, and it is intended therefore that this invention is limited only by the spirit and scope of the following claims.

What is claimed is:

1. Polyethylene having:
    a weight average molecular weight in the range of 150,000–1,000,000 g/mol;
    a number average molecular weight of at least 25,000 g/mol;
    a polydispersity in the range of 1.3–10; and
    wherein said polyethylene comprises co-monomer, said co-monomer being present in an amount up to 4 wt %; and
    wherein said polyethylene has a wear coefficient below $2.0 \cdot 10^{-4}$ mm$^3$/mN.
2. Polyethylene having:
    a melt viscosity of less than $10^6$ Pa.s; and
    a wear coefficient below $2.4 \cdot 10^{-4}$ mm$^3$/mN.
3. The polyethylene according to claim 2, wherein said polyethylene has a weight average molecular weight below 700,000 g/mol.
4. The polyethylene according to claim 2, wherein said polyethylene has a weight average molecular weight below 500,000 g/mol.
5. The polyethylene according to claim 2, wherein said polyethylene has a weight average molecular weight of as least 250,000 g/mol.
6. The polyethylene of according to claim 2, wherein said polyethylene has a co-monomer content of less 10 mol %.
7. The polyethylene according to claim 2, wherein said polyethylene has a co-monomer content in the range of 0.5–5 wt %.
8. The polyethylene according to claim 2, wherein said polyethylene has a wear coefficient below $2.0 \cdot 10^{-4}$ mm$^3$/mN.
9. The polyethylene according to claim 2, wherein said polyethylene has a polydispersity below 5.
10. The polyethylene according to claim 2, wherein said polyethylene has a polydispersity in the range of 2–4.

11. The polyethylene according to claim 2, wherein said polyethylene has a melting point of at least 100° C.

12. The polyethylene according to claim 2, wherein said polyethylene has a melt viscosity of less than $5 \cdot 10^5$ Pa.s.

13. The polyethylene according to claim 2, wherein said polyethylene has a number average molecular weight of at least 100,000 g/mol.

14. A process comprising melt-processing the polyethylene according to claim 2.

15. The process of claim 14, wherein said process includes injection molding said polyethylene.

16. An article obtained by the process according to claim 14.

17. An article comprising the polyethylene according to claim 2.

* * * * *